United States Patent Office 3,446,584
Patented May 27, 1969

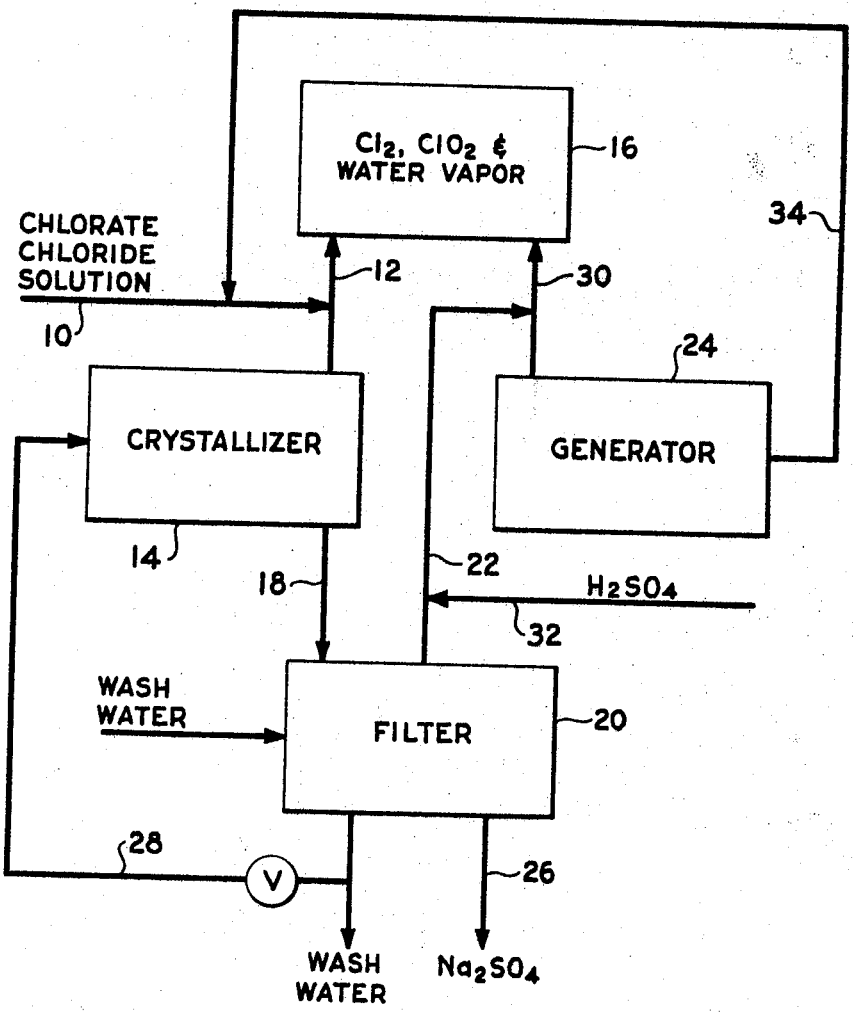

3,446,584
METHOD OF PRODUCTION OF CHLORINE DIOXIDE AND SODIUM SULFATE
Willard A. Fuller, Grand Island, N.Y., assignor to Hooker Chemical Corporation, Niagara Falls, N.Y., a corporation of New York
Filed Mar. 12, 1965, Ser. No. 439,193
Int. Cl. C01b 11/02; C01d 5/00
U.S. Cl. 23—121          10 Claims

ABSTRACT OF THE DISCLOSURE

There is provided a process for the generation of chlorine dioxide wherein sodium chlorate and a reducing agent are reacted in a generator zone at an acidity of more than 4.3 normal, and the effluent produced therein is passed to a crystallizing zone wherein replenishing amounts of sodium chlorate and reducing agent are added thereto, thereby causing further reaction. The crystallizing zone is maintained under reduced pressure to effect removal of the chlorine dioxide, chlorine, and water produced therein and to thereby cause sodium sulfate to precipitate.

---

This invention relates to the production of chlorine dioxide and the recovery of sodium sulfate. More particularly, this invention relates to a new process for the production of chlorine dioxide from sodium chlorate, chloride ion and sulfuric acid, and to the recover of sodium sulfate salts.

Many processes have been proposed for the production of chlorine dioxide from a chlorate, usually sodium chlorate, under acidic conditions. The more common processes generate chlorine dioxide by reaction of sodium chlorate in an acid solution in the presence of a reducing agent. In most instances, a mixture of chlorine dioxide and chlorine is evolved by such reactions, rather than a pure chlorine dioxide gas. Since the chlorine dioxide generated in this manner is normally used in the bleaching of cellulose products, such as pulp, the chlorine contained in the effluent gases is not detrimental, but actually contributes to the bleaching power of the gas. Because of the higher efficiencies of such processes which yield a mixed gas, sodium chloride and sodium chlorate have been continuously reacted in a solution which contains 30 percent or more of sulfuric acid.

In generating chlorine dioxide by reaction of sodium chlorate and a reducing agent, using sulfuric acid as the acidifying agent, a valuable by-product, useful in pulping operations, can be recovered. This product is sodium sulfate. Previously, the effluent generator liquor containing sodium and sulfate values was used directly in the pulping operation. This, however, may be unsatisfactory when sulfate values are not fully utilized. Also, controlling the amount of sulfate values added to the pulping process is complicated. The chlorine dioxide generation system may produce more sulfate liquor than can be used in the pulping operation and thereby create a disposed problem. It has been suggested to recover the sulfate values as a hydrated sodium sulfate salt. Such a method overcomes many of the previous problems but often extensive evaporation and refrigeration equipment may be required.

The present process eliminates the need for refrigeration, uses less evaporation equipment and effects the recovery of either an anhydrous sodium sulfate or a hydrated sodium sulfate. The capability of recovering an anhydrous sodium sulfate salt is a significant advancement, particularly where much of the previously used elaborate equipment is eliminated. Also, the anhydrous salt is a more desirable product. Also, previous methods produced hydrated sodium sulfate, which requires a dehydration step prior to fitting it for use in many processes.

It is an object of the present invention to provide a chlorine dioxide generation and sodium sulfate crystallization process which greatly reduces the equipment requirement and complexity of sodium sulfate recovery processes. Another object of this invention is to provide a process whereby chlorine dioxide can be generated in both the generator zone under highly acidic conditions and in the crystallizing zone under less acidic conditions. A further object of this invention is to provide a process whereby the effluent chlorine dioxide gas is maintained below its explosive limit by use of reduced pressure and/or dilution with water vapor. Yet, another object of this invention is to provide a method whereby sodium sulfate is crystallized at higher temperatures and as a more valuable anhydrous salt, thus eliminating the need for expensive refrigeration. These and other objects will become apparent to those skilled in the art from the description of the invention.

In accordance with the invention, a process is provided for the production of chlorine dioxide and sodium sulfate comprising reacting in a generator zone at an acidity of more than 4.3 normal, an aqueous solution of sodium chlorate and a reducing agent, thereby generating gaseous chlorine dioxide and chlorine, withdrawing liquid effluent from said generator zone, passing said liquid effluent to a crystallizing zone, adding to said liquid effluent replenishing amounts of aqueous sodium chlorate-reducing agent solution and further reacting said replenished solution to produce chlorine dioxide and chlorine, thereby reducing the acid normality in the crystallizer zone to less than 4.3 normal, maintaining the crystallization zone under a reduced pressure to effect removal of produced chlorine dioxide, chlorine and water vapor, thereby effecting the concentration of sodium ions and sulfate ions to precipitate sodium sulfate. For best operation, this process is preferably conducted continuously by removing sodium sulfate crystals from the crystallizer liquor and returning the mother liquor to the generator zone.

The present process provides a continuous method of generating chlorine dioxide and chlorine in both the generator and the crystallizer, the process being effected in two distinct stages, that is, the production of chlorine dioxide and chlorine in the generation zone under high acid normalities, and the production of chlorine dioxide and chlorine and in the crystallizer zone under lesser acid normalities and high vacuum. Thus, a highly economical chlorine dioxide production method is provided wherein either anhydrous and/or hydrated sodium sulfate is produced as a by-product in the crystallizing zone and wherein crystallization is effected at temperatures about the same as those utilized in the generator zone.

The present process effects a change in acid normality in the crystallizer zone, from that present in the generator zone, by dilution with replenishing amounts of aqueous sodium chlorate-chloride solution and by permitting continuation of the chlorine dioxide reaction, thereby further reducing the hydrogen ion concentration in the crystallizer. This eliminates the need for the addition of large quantities of water as previously required in chlorine dioxide-sodium sulfate crystallization processes which, in turn, further diluted the sodium ion and sulfate ion concentration in the crystallizer, thus requiring crystallization temperatures below zero degree centigrade. By the present process, the higher crystallizer operating temperature enables operation of the crystallizer at or near the boiling temperature of the chlorate solution under reduced pressure.

The invention is further described with reference to the drawing which is a partial schematic flow sheet illustrating the process of the invention.

The process as illustrated in the drawing is effected by feeding a sodium chlorate-chloride solution via lines 10 and 12 to crystallizer 14, preferably by a method in which the feed solution passes countercurrently to the effluent gases drawn from crystallizer 14 via line 12. Crystallizer 14 is operated under a vacuum of about 5 millimeters to about 350 millimeters of mercury, and preferably about 100 millimeters to about 250 millimeters of mercury. The temperature is retained near or at the boiling point of the reaction mixture in accordance with the reduced pressure. Thus, the temperature is maintained in the range of about 20 degrees centigrade to about 80 degrees centigrade, and more preferably in the range of about 35 degrees centigrade to about 70 degrees centigrade. Under the conditions of vacuum and temperature, large quantities of water are volatilized from the crystallizer and removed via line 12 with the chlorine dioxide and chlorine generated in the crystallizer.

The acid normality of the solution in the crystallizer is maintained at less than about 4.3 normal, and preferably between about 2.5 and 4.3 normal. Under such acidic conditions, temperatures and the presence of the added sodium chlorate-chloride solution, chlorine dioxide and chlorine are produced. The amount of chlorine dioxide produced is dependent to a large extent on the solution concentration, temperature and acidity. More chlorine dioxide and chlorine are produced at the higher acid normalities and the warmer temperatures.

Crystallizer 14 is supplied with heat by either external or internal heating, using either direct or indirect heating means or heat transfer agents, such as steam, hot water or other conventional heating methods. Various crystallizers can be used such as those having a vacuum flashing zone, either apart from the main crystallizing zone with circulation between the flashing zone and the crystallizing zone, or total vacuum evaporators, as well as various other crystallizers having circulation methods and flow patterns conventional to the crystallizing art. Thus, suitable crystallizers are those which are capable of operating under vacuums corresponding to the solution boiling points at temperatures ranging from about 20 degrees centigrade to about 80 degrees centigrade.

The sodium chlorate-chloride solution added to the crystallizer is an aqueous solution of sodium chlorate containing chloride ion at a concentration such that a ratio of about 0.1 mole to about 1.2 moles chloride ion per mole of sodium chlorate results in the crystallizer solution. When no additional reducing agent other than the chloride is used to effect the production of chlorine dioxide, it is preferred to have the sodium chlorate-chloride concentration ratio in the crystallizer at about an equimolar ratio. When additional reducing agents other than the chloride are used, less than about the equimolar ratio of chloride to chlorate is used.

The chloride ion added to the crystallizer may be added as sodium chloride or hydrochloric acid. The particular chloride ion used and the decision of whether to supplement the chloride ion with a reducing agent other than a chloride, are based upon the particular availability of hydrochloric acid and sodium chloride, the economic conditions, as well as the particular demand for sodium sulfate and chlorine. Thus, by supplementing or replacing the chloride ion with another reducing agent, such as sulfur dioxide, lesser amounts of sodium sulfate and chlorine are recovered from the process. Also, when hydrochloric acid is used as a partial or complete replacement for the sodium chloride, the lesser amounts of sodium ion present result in a lesser recovery of sodium sulfate. The exact feed solutions can be varied considerably with varying production requirements.

In most opertaions, chlorate cell liquor is a desirable source of sodium chlorate and sodium chloride. Cell liquor is readily adjusted to most ratios of chlorate to chloride. Conveniently, cell liquor containing 300 grams to about 700 grams per liter sodium chlorate and about 20 grams to about 200 grams per liter sodium chloride can be used.

With the addition of sodium chlorate-chloride feed solution to the crystallizer and the return of an aqueous sulfate solution from the generator zone, the volatilization of water from the crystallizer increases the sodium ion and sulfate ion concentration to effect the precipitation of sodium sulfate, at the crystallizer operating temperatures. It will be readily recognized that a more concentrated sodium ion-sulfate ion condition is required for crystallization at the higher crystallizer operating temperatures with crystallization being effected at lower concentrations at the lower temperatures. By effecting the crystallization at the higher temperature ranges wherein chlorine dioxide is more readily produced in the crystallizer, e.g., above about 30 degrees centigrade, depending on the presence of other materials, anhydrous sodium sulfate is precipitated. At lower temperatures below the transition point of sodium sulfate, hydrated sodium sulfate is precipitated.

Crystallizer solution containing precipitated sodium sulfate is continuously removed from crystallizer 14 via line 18 where it is passed through filter 20 prior to being routed via lines 22 and 30 to generator 24. Alternatively, mother liquor from filter 20 can be returned to crystallizer 14 and effluent liquor decanted from crystallizer 14 can be fed to generator 24. In filter 20, sodium sulfate is removed from the crystallizer solution and washed with water prior to being removed from filter 20 via line 26. Wash water, which is passed through filter 20, is returned in whole or in part to crystallizer 14 via line 28, as required. In normal operations, little or no water, in addition to the chlorate-chloride solution, is required in the crystallizer.

The crystallizer liquor, passing through filter 20, is subsequently fed to generator 24. This feed preferably enters generator 24 countercurrently to the effluent gases from the generator. Generator 24 operates under acidic conditions greater than those existing in the crystallizer. Therefore, additional quantities of sulfuric acid are added to generator 24 either directly or in admixture with the mother liquor from crystallizer 14 as via line 32. Sufficient sulfuric acid or acidic sulfate solutions from other generators is added to the generator so as to increase the acid normality of the generator liquor above 4.3 normal and preferably, to increase the acid normality to about 8 to about 12 normal. Concentrated sulfuric acid, e.g., 90 percent to 98 percent, is conveniently used.

The higher acidic conditions in the generator, the presence of a reducing agent for the chlorate values and the maintenance of a temperature in the range of about 20 degrees centigrade to 70 degrees centigrade, and preferably 30 degrees centigrade to 57 degrees centigrade, effect a rapid and efficient generation of chlorine dioxide.

Generator 24 can be operated as a conventional chlorine dioxide generator at about atmospheric pressure using an inert gas sweep, such as air, to aid in the removal and dilution of the chlorine dioxide produced from generator 24 via line 30. However, generator 24 can also be maintained under a vacuum of about 5 millimeters to about 350 millimeters of mercury or substantially equal to the vacuum maintained in the crystallizer. Thus, it is desirable to remove sufficient water from the generator to maintain the desired acid normality. This water is conveniently removed by vacuum operation. When operated under vacuum, normally an inert gas purge is not required to effect the removal of generated chlorine dioxide and chlorine and to effect dilution.

Generator 24 is supplied with heat by either external or internal heating using either direct or indirect heating means or heat transfer agents such as steam, hot water and other conventional heating methods. Also, various water evaporation methods can be used such as a vacuum flashing zone, either apart from the main generating zone with circulation between the flashing zone and the generator zone, or total vacuum evaporators, as well as various other generators having circulation methods and flow patterns conventional to chlorine dioxide generation.

In addition to or as a replacement for the chloride reducing agent added as the sodium chlorate-chloride solution to the crystallizer, other reducing agents can be used to supplement the reaction. Such reducing agents as sulfur dioxide, methanol, formaldehyde, formic acid, and the like, are conveniently used.

Effluent liquor from generator 24 is continuously withdrawn and returned to crystallizer 14 via line 34. Thus, the generator liquid effluent provides the feed of sulfate ions to the crystallizer wherein they are subsequently removed from the system by crystallization as sodium sulfate.

Chlorine dioxide, chlorine, and water vapor are fed to absorption means 16.

The following examples illustrate certain preferred embodiments of the present invention. Unless otherwise indicated, all parts and percentages are by weight and all temperatures are in degrees centigrade.

EXAMPLE 1

The process of the present invention is effected as illustrated in the drawing to produce chlorine dioxide wherein about 50 percent of the chlorine dioxide is produced in the crystallizer and the remaining 50 percent of the chlorine dioxide is produced in the generator.

An aqueous solution of 38.0 parts per minute of water, 16.6 parts per minute of sodium chlorate and 9.5 parts per minute of sodium chloride is fed to a vacuum crystallizer countercurrently to the gases being evolved from the crystallizer. The vacuum crystallizer has heating means for retaining the solution at the desired temperature under the vacuum conditions. Effluent liquor from a generator zone is also fed to the crystallizer in an amount which comprise 13.2 parts per minute of sulfuric acid, 12.7 parts per minute of sodium sulfate and 15.1 parts per minute of water. The mixed feed streams result in an acid normality of about 4.2 normal in the crystallizer. The crystallizer is maintained under a vacuum of about 200 millimeters of mercury and a temperature of about 65 degrees centigrade. Under these conditions, chlorine dioxide and chlorine are evolved in an amount of 5 parts per minute of chlorine dioxide and 2.5 parts per minute of chlorine in admixture with 41.3 parts per minute of water.

Effluent liquor from a settling zone in the crystallizer zone is continuously withdrawn and passed through a filter wherein 23.2 parts per minute of anhydrous sodium sulfate are removed. The filtrate is subsequently returned to the crystallizer. A second effluent stream is continuously withdrawn from another portion of the crystallizer and fed to a generator. The generator is suitable for vacuum operation and has heating means for sustaining the desired temperature under the vacuum conditions.

The effluent liquor from the crystallizer which is fed to the generator zone contains about 4.2 moles per liter of hydrogen ion, 7.45 moles per liter of sodium ion, 2.76 moles per liter of sulfate ion, 3.13 moles per liter of chloride ion and 3.0 moles per liter of chlorate ion in aqueous solution. In addition to the crystallizer effluent fed to the generator, 16.3 parts per minute of 98 percent sulfuric acid are fed to the generator.

The generator is operated at a temperature of about 71 degrees centigrade under a vacuum of about 200 millimeters of mercury. Chlorine dioxide and chlorine are evolved from the generator in an amount of 5 parts per minute of chlorine dioxide and 2.5 parts per minute of chlorine in admixture with 1.7 parts per minute of water.

The continuous operation of the crystallizer and generator effects the produtcion of 10 parts per minute of chlorine dioxide and 5 parts per minute of chlorine in admixture with 43 parts per minute of water. Also produced as a by-product are 23.2 parts per minute of anhydrous sodium sulfate.

EXAMPLE 2

A mixture of chlorine dioxide and chlorine is produced by the method of this invention wherein about 50 percent of the chlorine dioxide is produced in the crystallizer and the remaining 50 percent is produced in the generator. This example further illustrates chlorine dioxide production at a rate similar to that of Example 1, wherein less sodium sulfate is produced by utilizing an additional reducing agent to supplement the chloride reducing agent.

An aqueous solution of 31.8 parts per minute of water, 16.6 parts per minute of sodium chlorate and 6.5 parts per minute of sodium chloride is fed to a crystallizer similar to that of Example 1, in addition to liquid effluent from a generator zone which comprises about 9.0 parts per minute of sulfuric acid, 9.9 parts per minute of sodium sulfate and 10.3 parts per minute of water. The mixing of these feed solutions in the crystallizer effects the production of chlorine dioxide and chlorine, which further reduce the acid normality of the solution in the crystallizer so as to result in an acidity of about 4.2 normal.

The crystallizer is maintained at a temperature of about 60 degrees centigrade under a vacuum of about 150 millimeters of mercury. Under the conditions of acidity, temperature and the chlorate and chloride ion concentration, 5 parts per minute of chlorine dioxide, 2.5 parts per minute of chlorine and 33.6 parts per minute of water are evolved from the crystallizer. The removal of large quantities of water from the crystallizer, the chlorine dioxide production, and the sodium chlorate-chloride replenishment, increases the concentration of sodium ions and sulfate ions, thereby effecting the crystallization of sodium sulfate.

Liquid effluent, from the crystallizer, is continuously removed, thereby removing a mixture of crystallized sodium sulfate and mother liquor. The sodium sulfate crystals are removed from solution by passing through a filter. The mother liquor is subsequently passed to the generator. In this manner, 18.9 parts per minute of anhydrous sodium sulfate are recovered from the crystallizer.

The mother liquor removed from the crystallizer has a concentration of about 4.2 moles per liter of hydrogen ion, 7.52 moles per liter of sodium ion, 2.76 moles per liter of sulfate ion, 1.7 moles per liter of chloride ion and 4.5 moles per liter of chlorate ion. This solution is mixed in a generator similar to that of Example 1, with 10.8 parts per minute of concentrated sulfuric acid. The acid addition increases the normality of the solution in the generator to about 10 normal. Also fed to the generator, are 1.1 parts per minute of sulfur dioxide, which provides an additional reducing agent for the sodium chlorate.

The generator is maintained at a temperature of about 66 degrees centigrade under a pressure of about 150 milliliters of mercury. The conditions of temperature, acidity and chlorate ion concentration effect the production of chlorine dioxide and chlorine in an amount of 5 parts per minute of chloride dioxide and 1.8 parts per minute of chlorine, while effecting the removal of 1.7 parts per minute of water.

Thus, under continuous operations, a total of 10 parts per minute of chlorine dioxide, 4.3 parts per minute of chlorine and 18.9 parts per minute of anhydrous sodium sulfate are produced.

The present invention is also readily effected by operating the crystallizer zone at acid normalities between about 2.5 and 4.3 normal, and at temperatures ranging from about 20 degrees centigrade to about 80 degrees centigrade with vacuums sufficiently high at the given temperature to effect a high vapor pressure in the crystallizer. Also, by operating the crystallizer at the lower temperatures, hydrated sodium sulfate can be produced.

The generator zone can be operated at acid normalities other than those of Examples 1 and 2, especially those ranging from 4.3 up to about 12 normal, and preferably between about 8 and 12 normal. Inert gases other than air can also be used to sweep the generator and aid in the dilution of the produced chlorine dioxide.

While there have been described various embodiments of the present invention, the methods described herein are not intended to be understood as limiting the scope of the invention, as it is realized that changes therein are possible. It is further intended that each element recited in any of the following claims is to be understood as referring to all equivalent elements for accomplishing substantially the same results in substantially the same or equivalent manner. It is intended to cover the invention broadly in whatever form its principles may be utilized.

What is claimed is:

1. A process for the production of chlorine dioxide and sodium sulfate, comprising:
    (a) reacting in a generator zone at an acidity of more than 4.3 normal an aqueous solution of sodium chlorate and a reducing agent, thereby generating gaseous chlorine dioxide and chlorine;
    (b) withdrawing liquid effluent from said generator zone;
    (c) passing said liquid effluent to a crystallizing zone;
    (d) adding to said liquid effluent replenishing amounts of aqueous sodium chlorate-reducing agent solution and further reacting said replenished solution to produce chlorine dioxide and chlorine, thereby reducing the acid normality in the crystallizer zone to less than 4.3 normal; and
    (e) maintaining the crystallizer zone under a reduced pressure of about 5 millimeters to about 350 millimeters of mercury and at a temperature of about 20 degrees centigrade to about 80 degrees centigrade to effect removal of produced chlorine dioxide, chlorine, and water vapor, thereby effecting the concentration of sodium ions and sulfate ions and precipitating sodium sulfate.

2. The process of claim 1 wherein the crystallizer zone is maintained at a temperature of 35 degrees centigrade to 70 degrees centigrade and a vacuum of 100 millimeters to 250 millimeters of mercury.

3. The process of claim 2 wherein the precipitated sodium sulfate is removed from the crystallizer effluent and the mother liquor returned to the generator zone.

4. A process for the continuous production of chlorine dioxide and sodium sulfate comprising reacting in a generator zone at an acidity of 8 to about 12 normal, an aqueous solution of sodium chlorate and a chloride selected from the group consisting of sodium chloride and hydrochloric acid, at a temperature of 20 degrees centigrade to 70 degrees centigrade, thereby generating gaseous chlorine dioxide and chlorine, withdrawing liquid effluent from said generator zone, passing said liquid effluent to a crystallizing zone, adding to said liquid effluent replenishing amounts of aqueous sodium chlorate-chloride solution, and further reacting said replenished solution to produce chlorine dioxide and chlorine thereby reducing the acid normality in the crystallizer zone to about 2.5 to 4.3 normal, maintaining the crystallizer zone at a temperature of about 20 degrees centigrade to 80 degrees centigrade and under a vacuum sufficient to effect the removal of water vapor, thereby effecting the concentrating of sodium ions and sulfate ions and thereby precipitating sodium sulfate.

5. The process of claim 4 wherein an additional reducing agent other than a chloride is used in the generator zone.

6. The process of claim 5 wherein the additional reducing agent is sulfur dioxide.

7. A process for the continuous production of chlorine dioxide and sodium sulfate comprising reacting in a generator zone at an acidity of about 8 to 12 normal under vacuum of 5 millimeters to 350 millimeters of mercury, an aqueous solution of sodium chlorate and a reducing agent selected from the group consisting of sodium chloride, hydrochloric acid, sulfur dioxide, and mixtures thereof, at a temperature of 20 degrees centigrade to 70 degrees centigrade, thereby generating gaseous chloride dioxide and chlorine, withdrawing liquid effluent from said generator zone, passing said liquid effluent to a crystallizer zone, adding to said liquid effluent replenishing amounts of aqueous sodium chloride and reducing agent, further reacting said replenished solution to produce chlorine dioxide and chlorine thereby reducing the acid normality in the crystallizer zone to about 2.5 to 4.3 normal, maintaining the crystallizer zone at a temperature of about 35 degrees centigrade to 70 degrees centigrade and a vacuum of 100 millimeters to 250 millimeters of mercury thereby effecting the removal of chlorine dioxide, chlorine and water vapor and effecting the concentrating of sodium ions and sulfate ions, precipitating anhydrous sodium sulfate, removing crystallizer liquid effluent containing sodium sulfate crystals, separating the crystals from the liquid effluent and returning the effluent to the generator zone.

8. In a process for the crystallization of sodium sulfate from a chlorine dioxide generation process wherein chlorine dioxide is produced by acidifying a sodium chlorate solution and a reducing agent with sulfuric acid, the improvement comprising feeding an aqueous acidic generator liquor containing sulfate ions, and sodium ions, to a crystallizer zone, adding to said aqueous solution additional amounts of aqueous sodium chlorate-reducing agent solution, further reacting said solution under a vacuum of 5 millimeters to 350 millimeters of mercury and at a temperature of 20 degrees centigrade to 80 degrees centigrade thereby producing further chlorine dioxide and reducing the acidity to 2.5 to 4.3 normal, and effecting the removal of substantial amounts of water as vapor, and effecting the concentration of sodium ions and sulfate ions to precipitate sodium sulfate.

9. A process for the continuous production of chlorine dioxide and sodium sulfate comprising reacting in a generator zone at an acidity of 8 to about 12 normal an aqueous solution of sodium chlorate and a chloride selected from the group consisting of sodium chloride and hydrochloric acid at a temperature of 20 degrees centigrade to 70 degrees centigrade, thereby generating gaseous chlorine dioxide and chlorine; withdrawing liquid effluent from said generator zone; passing said liquid effluent to a crystallizing zone; adding to said liquid effluent replenishing amounts of aqueous sodium chlorate-chloride solution; further reacting said replenished solution to produce chlorine dioxide and chlorine, thereby reducing the acid normality in the crystallizer zone to about 2.5 to 4.3 normal; maintaining the crystallizer zone at a temperature of about 20 degrees centigrade to 80 degrees centigrade; and maintaining both the generator and crystallizer zones under vacuums sufficient to effect the removal of water vapor, the vacuums in said zones being substantially the same, thereby effecting the concentration of sodium ions and sulfate ions and precipitating sodium sulfate.

10. The process of claim 9, wherein the crystallizer and generator zones are maintained under a vacuum of 5 to 350 millimeters of mercury.

References Cited

UNITED STATES PATENTS

| 2,811,420 | 10/1957 | Pernert | 23—121 X |
| 3,341,288 | 9/1967 | Partridge et al. | 23—121 X |

OSCAR R. VERTIZ, *Primary Examiner.*

E. C. THOMAS, *Assistant Examiner.*

U.S. Cl. X.R.

23—152